United States Patent [19]

Nakamura et al.

[11] Patent Number: 5,113,349
[45] Date of Patent: * May 12, 1992

[54] METHOD AND SYSTEM FOR STORING/REMOVING AND DISTRIBUTING ARTICLES OF MANUFACTURE

[75] Inventors: Katsunari Nakamura; Keiichiro Ueda; Yoshiro Irie; Toyokazu Hoshi; Motozou Kawakami, all of Kanagawa, Japan

[73] Assignee: Fuji Electric Co. Ltd., Japan

[*] Notice: The portion of the term of this patent subsequent to Apr. 9, 2008 has been disclaimed.

[21] Appl. No.: 378,978

[22] Filed: Jul. 12, 1989

Related U.S. Application Data

[63] Continuation-in-part of Ser. No. 326,130, Mar. 20, 1989, Pat. No. 5,006,996.

[30] Foreign Application Priority Data

| Mar. 26, 1988 | [JP] | Japan | 63-72793 |
| Jun. 17, 1988 | [JP] | Japan | 63-149771 |
| Jul. 12, 1988 | [JP] | Japan | 63-173443 |

[51] Int. Cl.⁵ ............... G06F 15/46; B65G 63/00
[52] U.S. Cl. ................... 364/478; 364/424.07; 235/385; 340/825.54; 340/825.72; 414/273
[58] Field of Search ........... 364/468, 478, 424, 02, 364/424.07, 424.01; 414/272, 273, 274, 279; 235/375, 385, 380; 340/425, 54, 825.72, 505, 572; 455/607; 340/572; 198/350

[56] References Cited

U.S. PATENT DOCUMENTS

| 4,646,245 | 2/1987 | Prodel et al. | 364/468 |
| 4,669,047 | 5/1987 | Chucta | 364/468 |
| 4,786,229 | 11/1988 | Henderson | 364/478 |
| 4,814,742 | 3/1989 | Morita et al. | 455/607 |
| 4,827,395 | 5/1989 | Anders et al. | 364/468 |
| 4,831,540 | 5/1989 | Hesser | 364/468 |
| 4,839,875 | 9/1991 | Kuriyama et al. | 235/375 |
| 4,918,296 | 4/1990 | Fujisaka et al. | 235/380 |
| 4,921,087 | 5/1990 | Nakamura | 198/350 |
| 4,924,210 | 5/1990 | Matsui et al. | 340/572 |
| 5,006,996 | 4/1991 | Nakamura et al. | 364/478 |

Primary Examiner—Jerry Smith
Assistant Examiner—Jim Trammell

[57] ABSTRACT

A physical distribution system having a shelf storage unit for storing at least one article; a conveying unit having a terminal unit for conveying an article to and from the shelf; a memory unit for storing and retrieving data from the terminal unit, data relating to the article and data relating to the shelf address; and a data processing unit for transferring data relating to the storage/removal of article(s) to and from the terminal unit of the conveying unit; wherein the memory unit is mounted on the article(s) or is mounted on an article carrying unit which is used for carrying the article(s). The memory unit may be provided on the shelf storage unit removably.

5 Claims, 10 Drawing Sheets

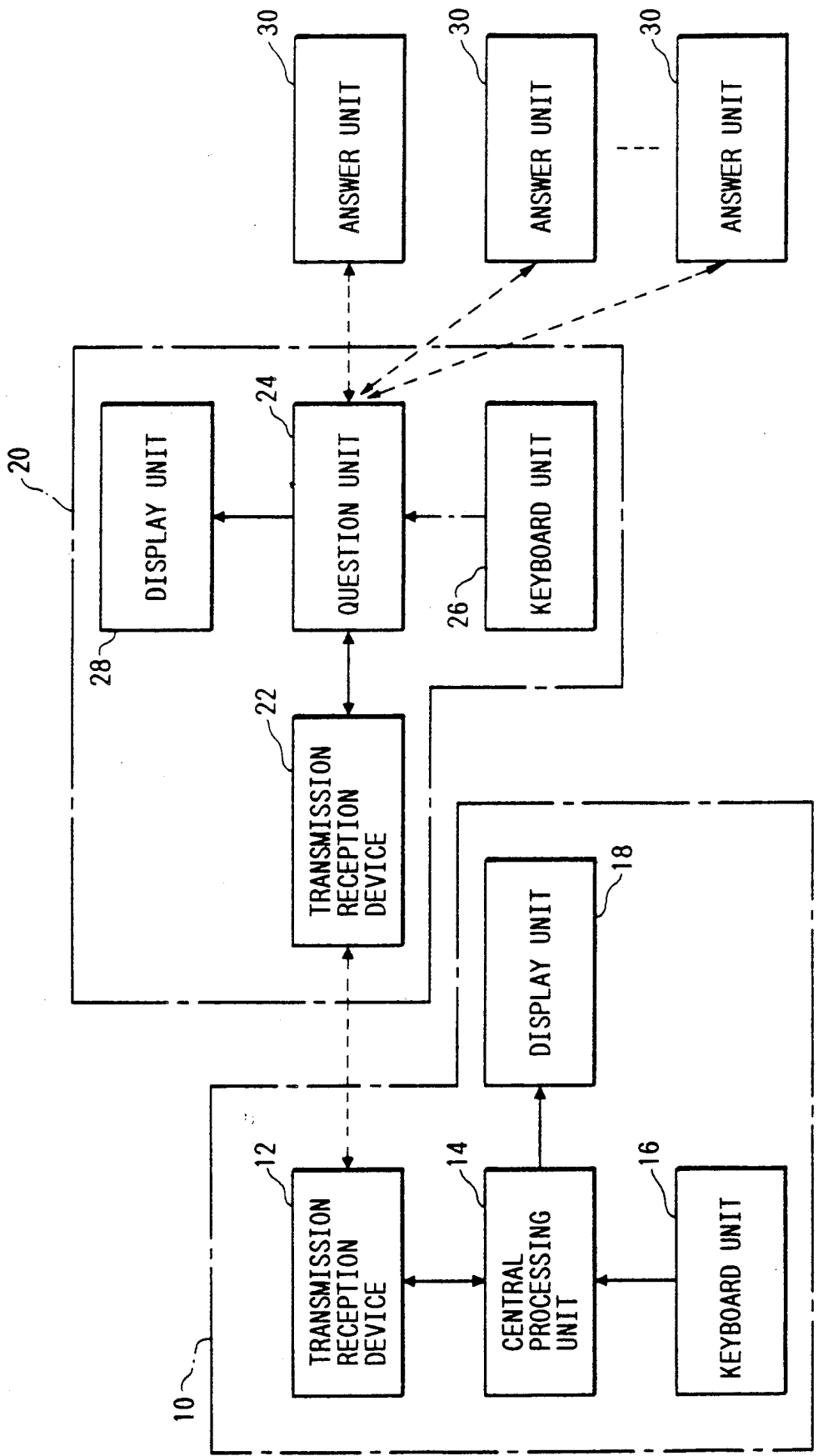

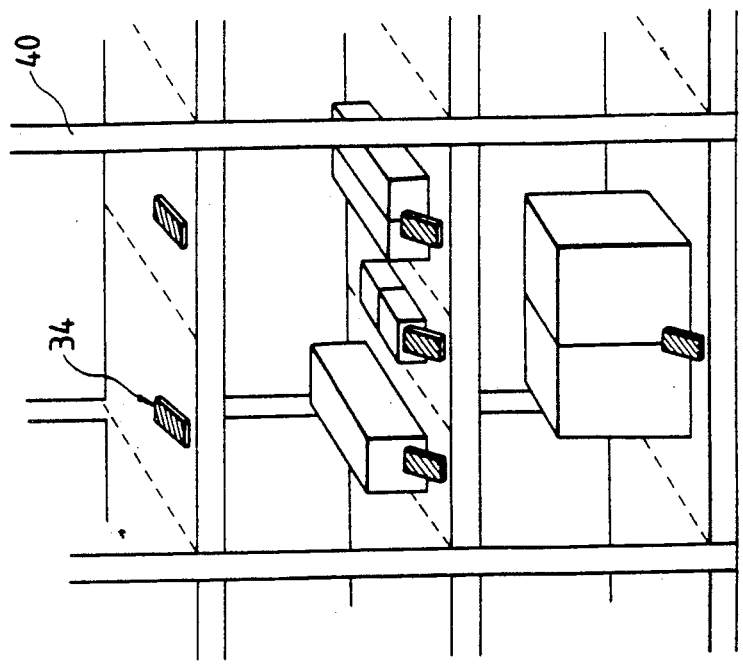
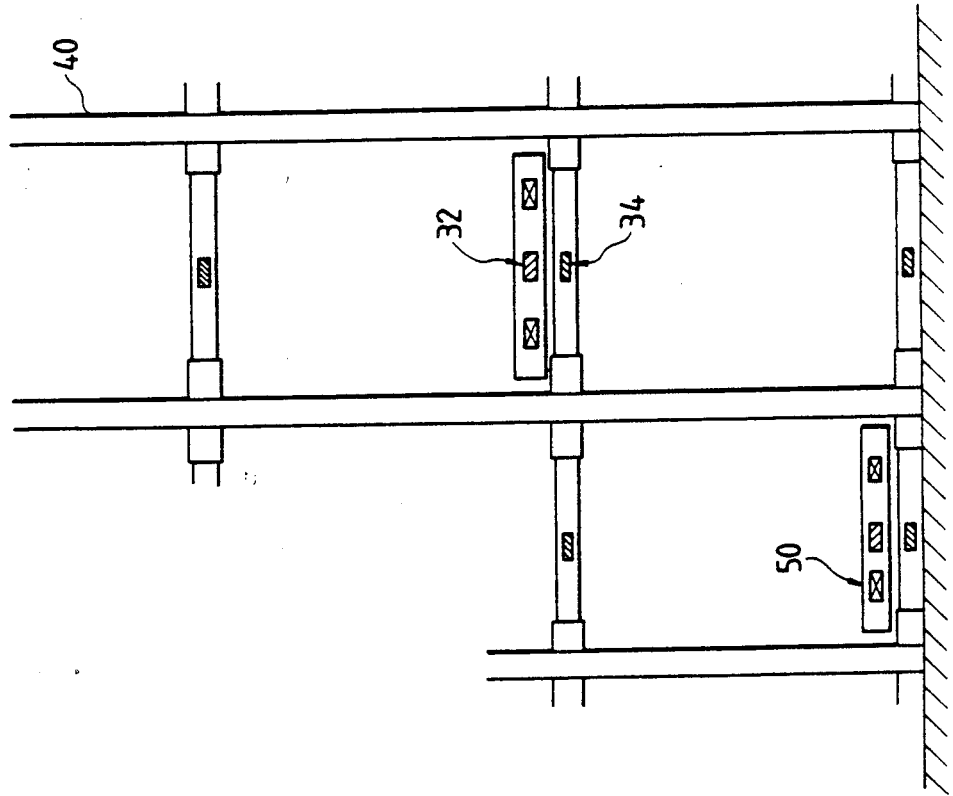

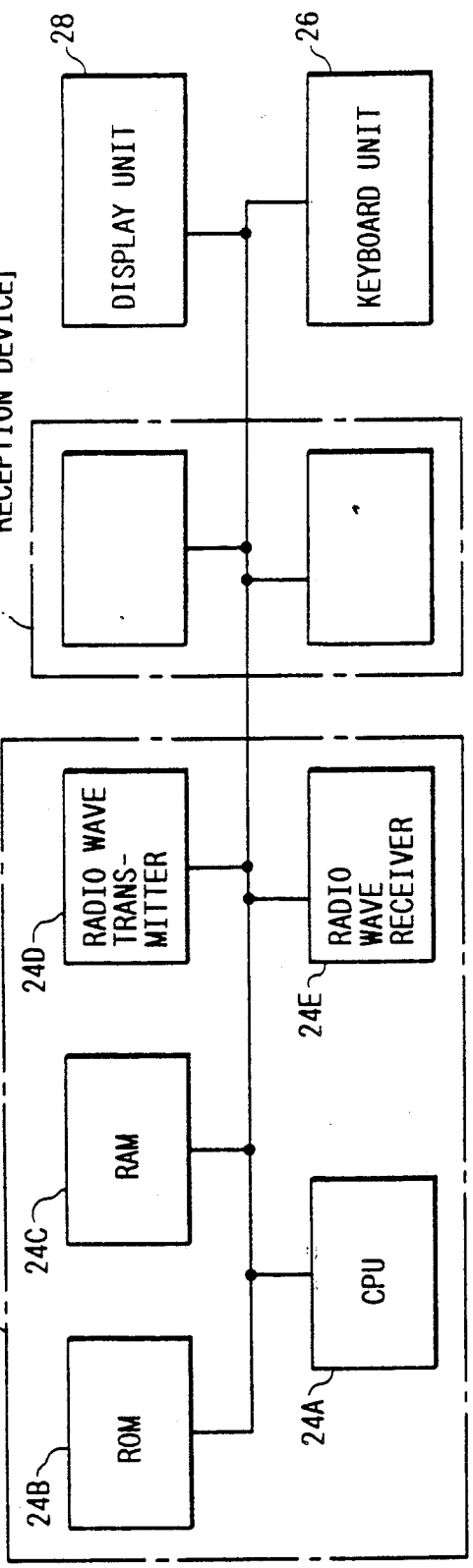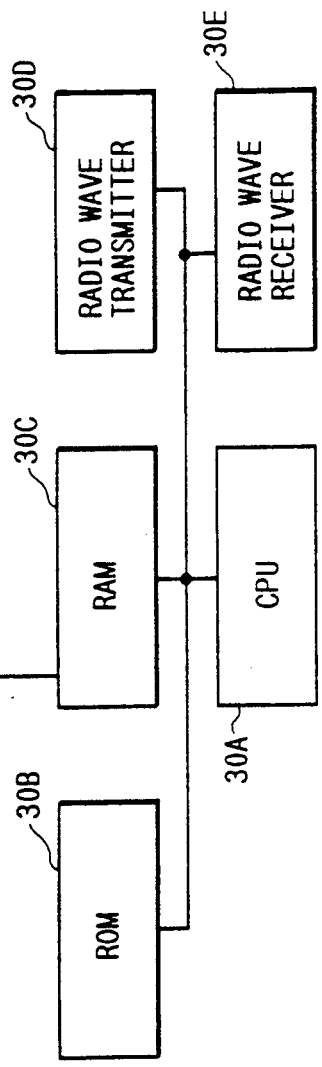

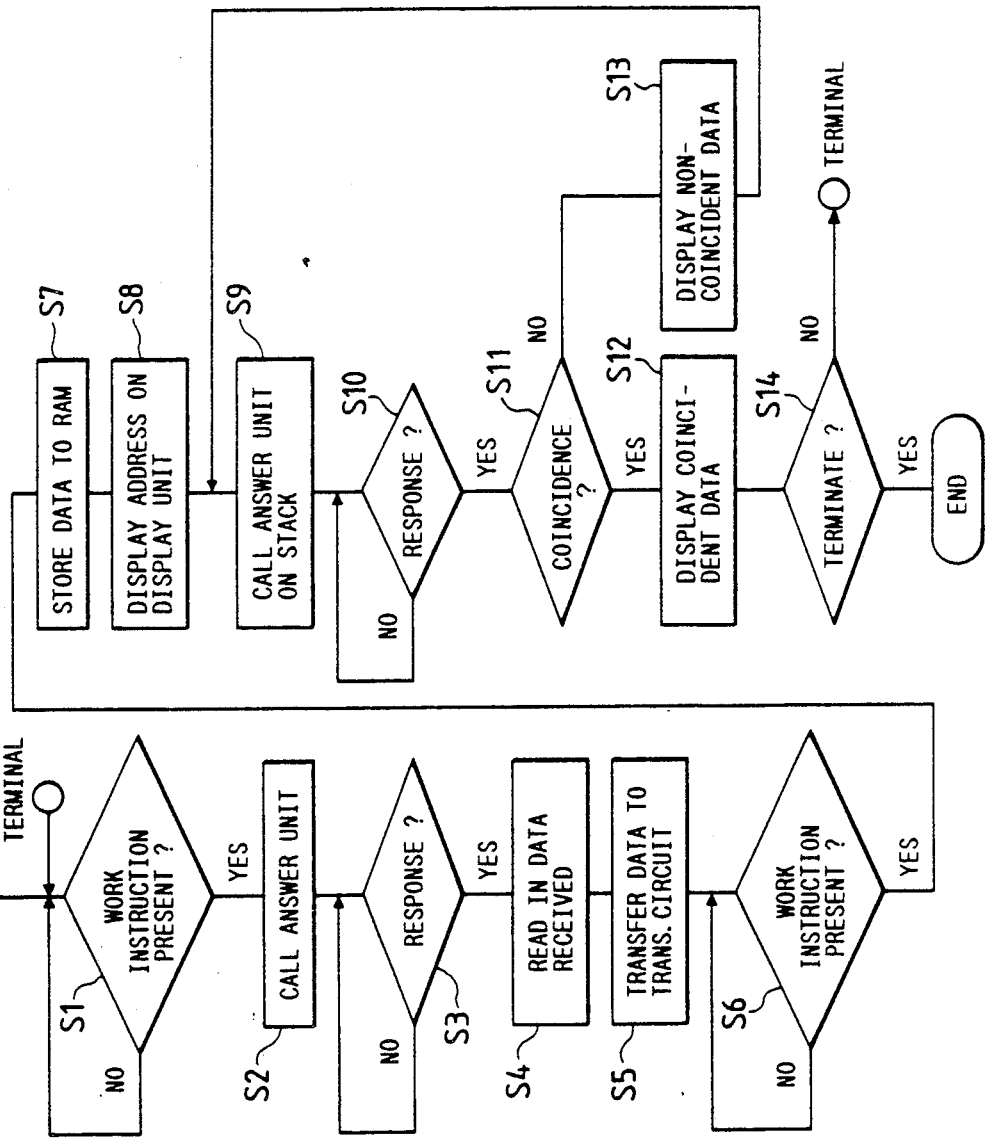

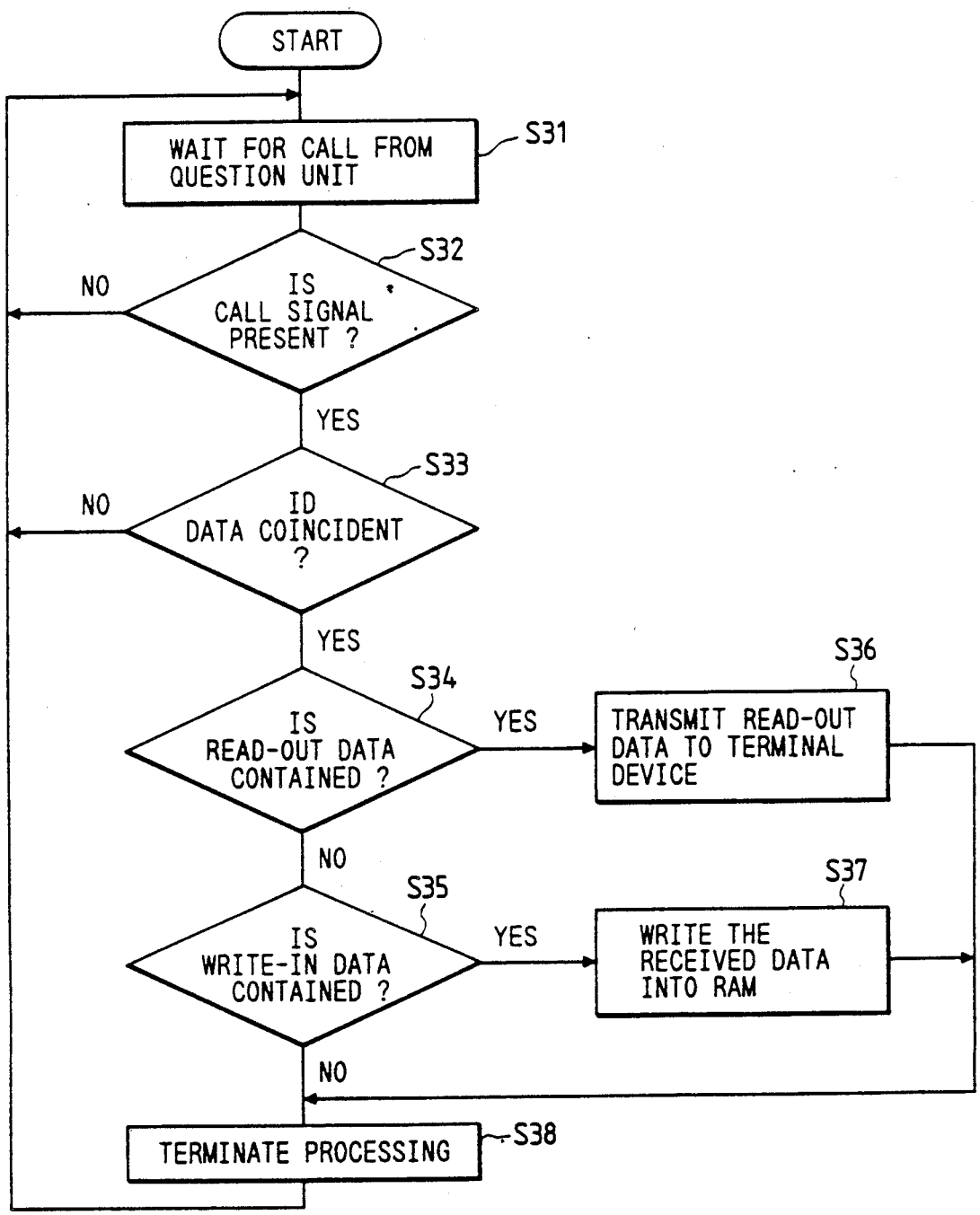

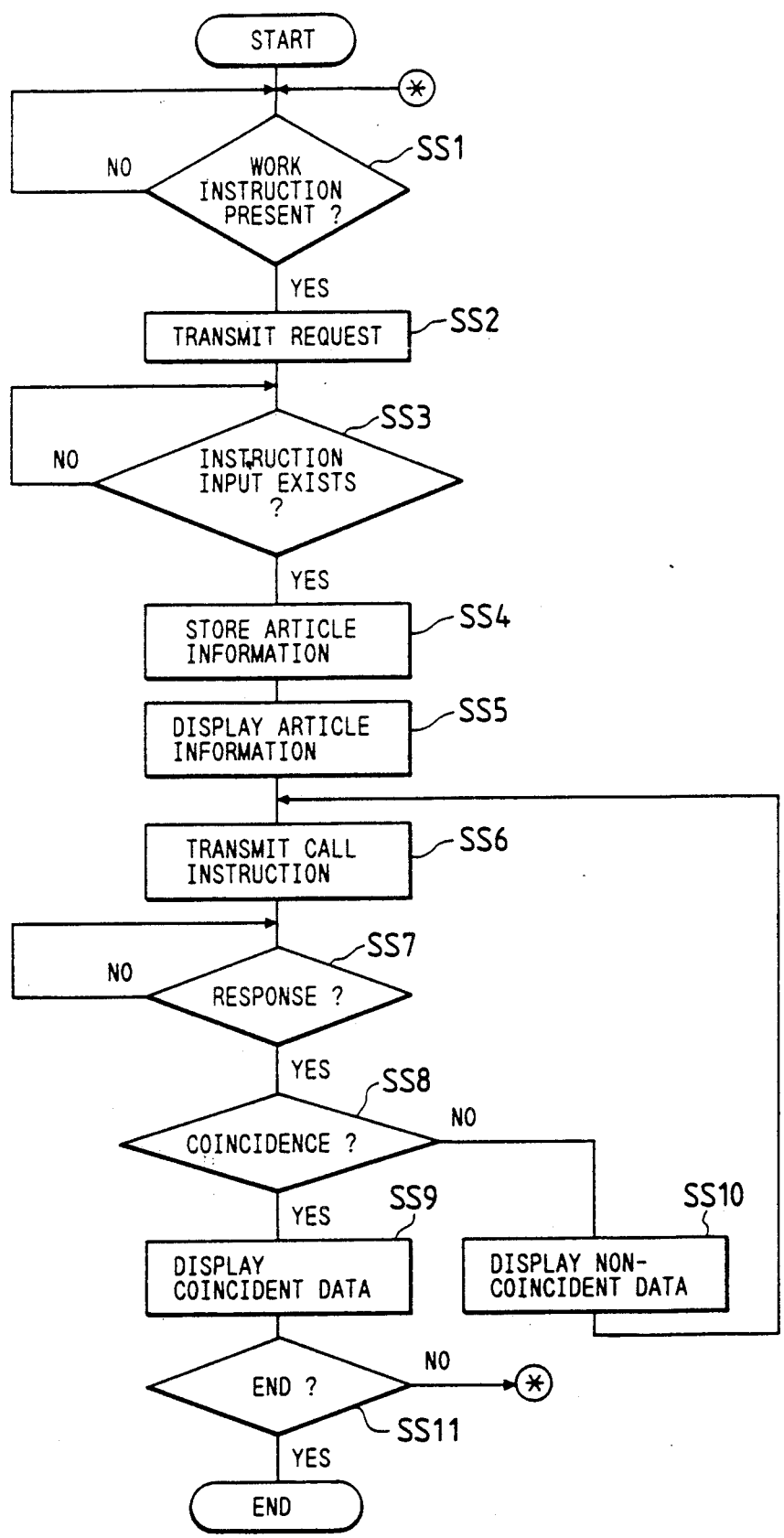

METHOD AND SYSTEM FOR STORING/REMOVING AND DISTRIBUTING ARTICLES OF MANUFACTURE

This is a continuation-in-part application of Ser. No. 07/326,130, filed Mar. 20, 1989, for PHYSICAL DISTRIBUTION SYSTEM and now U.S. Pat. No. 5,006,996.

BACKGROUND OF THE INVENTION

1. Field of the Invention

The present invention is directed generally to a distribution system and, more particularly, is directed to a physical distribution system for conveying, storing and retrieving articles of manufacture.

2. Description of Related Art

There are several methods or systems used for storing articles of manufacture and commodities in warehouses. A first method is based on an automatic warehouse in which the articles and commodities are automatically conveyed to shelves. A second system comprises an operator who stores the commodities by transporting the goods to open storage space. A third method, called ground placement, involves simply piling the goods on the floor of a warehouse.

The storing method based on an automatic warehouse has certain desirable features. For example, the warehouse space is efficiently and effectively used. Stock inventory information, such as the identity and quantity of stored items, may be stored in a computer system and used in connection with the addresses assigned to the shelves. Further, an inventory management data processing system in which stock inventory data is processed and updated by a computer system is possible.

There are, however, several inherent disadvantages to the automatic warehouse. A great deal of space is required to build such structures and to configure the entire warehouse for usage. Furthermore, in such warehouses, the layout designs for the shelves, the inner space of the warehouse and the conveying paths for conveying means are determined and fixed at the design stage. Accordingly, when physical distribution conditions change and the size and shapes of goods change, it is very difficult to modify the structure of the warehouse to accommodate such changes. Thus, the conventional automatic warehouse cannot flexibly cope with changes in the conditions of physical distribution. This drawback is compounded by the fact that it takes a long period of time to build such warehouses.

The two manual storage methods described above are advantageous from the standpoint that construction costs are low. Additionally, the actual locations for storing the goods may be flexibly selected. The disadvantages of manual storage methods stem from the fact that storing/unstoring management and inventory data management are poor. In such manual storage methods, ledgers and shelf cards are generally used to keep track of inventory. The inventory data, together with dates, are posted in a ledger. Each shelf is provided with a shelf card having a description of the kinds and the quantity of goods placed thereon. When storing and removing items to and from the shelf, an operator enters data relating to the identity and quantity of goods on the related card. Accordingly, every time goods are stored or removed, the related data must be recorded on the card. Since the ledger is of the book style requiring manual recording, the recording of inventory data is not reliable and is prone to human error. This is especially apparent when an inventory of stored items is made. Too much time is required to verify the ledgers with the cards.

There is, however, another storage method comprising a conveying means such as, for example, a forklift operated by an operator to convey goods. A computer system is used to send data representing an address of each shelf to the conveying means. The operator stores or removes goods on a shelf on the bases of the received data. In this method, however, an operation guide is merely indicated at the conveying means. Therefore, even when the operator mistakenly stores or removes goods from a wrong shelf location, the computer system, nevertheless, continues its operation. The result is that the inventory data stored in the computer system becomes noncoincident with actual inventory in the warehouse. This creates an additional task of having to print out the stored data of the computer system and then comparing the data with the stored items on the shelves for verification purposes, i.e., manual inventory check and verification.

In summary, there exist physical distribution systems that are not satisfactory from the standpoint of efficient and effective updating of inventory data, manufacture cost-effectiveness and efficient operability.

SUMMARY OF THE INVENTION

The present invention overcomes the problems and disadvantages of the prior art by providing a novel physical distribution system that accurately and quickly records and stores storage/removal data and inventory data into a data processing system. The present invention represents a vast improvement and a novel approach for satisfying and meeting the needs, requirements and criteria for an effective and useful physical distribution system in a safe, reliable and cost effective manner.

Accordingly, an object of the present invention is to provide a physical distribution system that accurately and quickly records and stores storage/removal data and inventory data in a data processing system.

Another object of the present invention is to provide a physical distribution system that is flexible and adaptable to changing physical distribution conditions.

Yet another object of the present invention is to provide a physical distribution system that is cost efficient to manufacture and service.

Still another object of the present invention is to provide a physical distribution system that exhibits excellent and reliable recordation, storage and retrieval of data.

Additional objects and advantages of the present invention will be set forth, in part, in the description which follows and, in part, will be obvious from the description or may be learned by and attained by means of the instrumentalities and combinations particularly pointed out in the appended claims.

To achieve the foregoing objects and in accordance with the purpose of the present invention, as embodied and broadly described herein, a first aspect of the physical distribution system of the present invention comprises a shelf storage unit for storing at least one article; a conveying unit having a terminal unit for conveying an article to and from the storage shelf; a memory unit for storing and retrieving data from the terminal unit, data relating to the article and data relating to the shelf address; and a data processing unit for transferring and processing data relating to the storage/removal of articles to and from the terminal unit of the conveying unit; wherein the memory unit is mounted on the article or is mounted on an article carrying unit which is used for carrying the article.

A second aspect of the physical distribution system of the present invention comprises a shelf storage unit for storing at least one article; a conveying unit having a terminal unit for conveying an article to and from the storage shelf; a memory unit for storing and retrieving data from the terminal unit, data relating to the article; and a data processing unit for transferring and processing data relating to the storage/removal of articles to and from the terminal unit of the conveying unit; wherein the memory unit is removably provided shelf storage.

The accompanying drawings, which are incorporated in and constitute a part of this specification, illustrate one embodiment of the present invention and, together with the description, serve to explain the principles of the present invention.

BRIEF DESCRIPTION OF THE DRAWINGS

FIG. 1 is a schematic diagram showing the circuit configuration of a control system used in the present physical distribution system;

FIG. 3A is a side, elevational section view of a storage stack illustrating the layout of answer units as used in the first aspect of the present physical distribution system;

FIG. 3B is a perspective view of a storage stuck illustrating the layout of answer units as used in the second aspect of the present physical distribution system;

FIG. 4 is a schematic diagram showing the circuit configuration of a terminal device comprising a logic circuit;

FIG. 5 is a schematic diagram showing the circuit configuration of an answer unit used in the present invention;

FIG. 6 is a flowchart diagram showing the control logic of the logic circuit;

FIG. 7A is a flowchart diagram showing the control logic of an answer unit of the first aspect of the present physical distribution system;

FIG. 10 is a flowchart diagram showing the control logic of a question unit which is to be used in the second aspect of the present physical distribution system;

DESCRIPTION OF THE PREFERRED EMBODIMENT

Figure 2A:
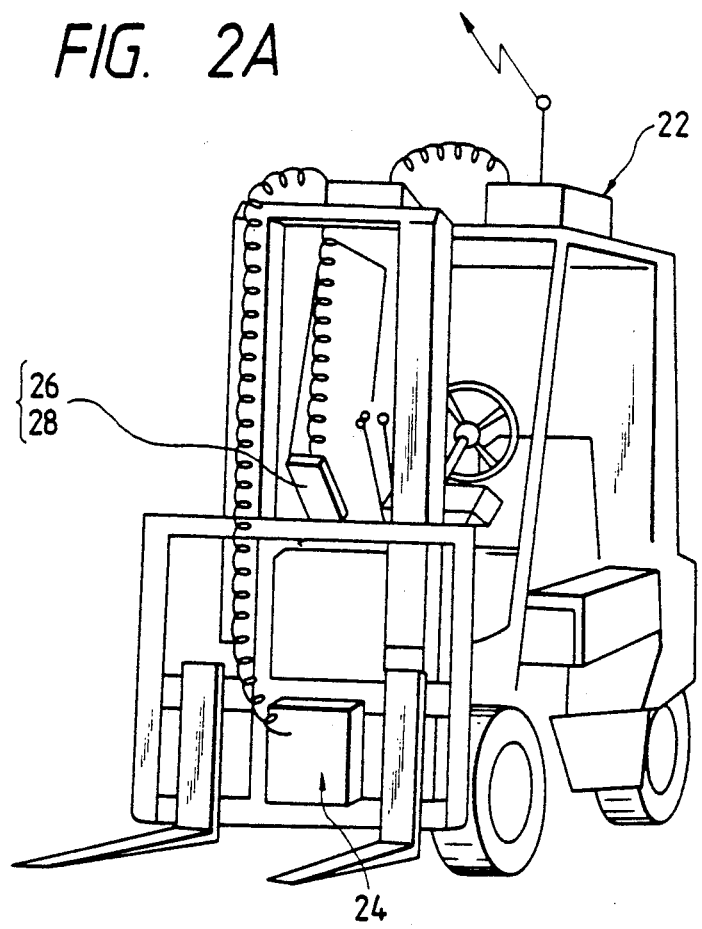
FIG. 2A is a perspective view of a first example of a conveying unit having a terminal device installed thereon which is used in the first aspect of the present physical distribution system.

Reference will now be made in detail, to a preferred embodiment of the present invention, examples of which is illustrated in the accompanying drawings. Whenever possible, the same reference numbers will be used throughout the drawings to refer to the same or like parts.

In the first aspect of the physical distribution system of the present invention, a memory unit is provided on an article carrying unit, e.g., a pallet, and/or an article storage shelf. Before an article is stored inside a warehouse, data relating to the article is stored into the memory unit of the article carrying unit. When an article is being stored into a warehouse, a terminal unit on a conveying unit (e.g., a forklift) reads out the data relating to the article from the memory unit on the article carrying unit and transmits the data to a data processing unit. The data processing unit stores this data in a separate memory unit as inventory or stock data. Concurrently, the data processing unit sends address data to the terminal unit on the conveying unit identifying the article storage shelf on which the article carrying unit is to be placed. The conveying unit is moved to the article storage shelf as identified by the address data, and the article carrying unit is placed on the storage shelf. At this time, the terminal unit on the conveying unit reads out the address data from the memory unit installed on the storage shelf and compares this data with the address data previously transmitted by the processing unit to ensure that the two address data coincide with each other. Through this data correlation and verification step, it is possible to ensure that the inventory data relating to the articles stored on a particular article storage shelf, i.e., storage shelf address, exactly reflect the true and actual inventory of articles on the particular article storage shelf. Accordingly, the data stored by the data processing unit in the separate memory unit precisely reflect the identity and quantity of articles stored in any given storage shelf address and, thus, serve as a ledger.

When an article is removed from the warehouse, the terminal unit on the conveying unit receives data from the data processing unit, which contains information relating to the identity and quantity of articles and the storage shelf address from which the article is to be removed. By using this data, the conveying unit is moved to the indicated storage shelf address, and the terminal unit on the conveying unit verifies the storage shelf address by read out of the memory unit installed on the storage shelf. The terminal unit then verifies the data relating to the identity and quantity of articles. The conveying unit then removes the articles from the storage shelf.

When an inventory of the stored articles is desired, the terminal unit on the conveying unit reads out the address data from each memory unit installed on the storage shelves and transmits this data to the data processing unit. The data processing unit, in turn, transmits to the terminal unit inventory data relating to the identity and quantity of articles that are recorded as being present at the particular storage shelf. The terminal unit displays this inventory data and an operator compares the inventory data shown by the terminal with the actual inventory of articles stored on the particular storage shelf.

Referring now to FIG. 1, reference number 10 generally indicates a host computer system, which is used as a data gathering and processing unit. Operatively associated with the host computer is a transmission/reception circuit 12 for transmitting and receiving data by appropriate radio waves. The circuit 12 communicates with a terminal device 20 and receives inventory data from, for example, answer units 30 installed on article carrying units (e.g., pallets) and storage shelves on which the articles are stored, and relays data back and forth between the host computer 10 and the terminal device 20. A central processing unit (CPU) 14 receives data from the transmission/reception circuit 12, stores the data to an external memory unit (not shown), and displays the data via a display unit 18, e.g., a CRT screen. A keyboard 16 is operatively associated with the CPU 14 for entering data and instructions into the CPU 14. The host computer system 10 may be installed in a warehouse or an office room.

Terminal device 20 is installed in an article conveying unit such as a forklift and is used for transferring data to and from the host computer system 10 by radio waves. In the terminal device 20, a transmission/reception circuit 22 is used to transfer data to and from the transmission/reception circuit 12 in the host computer system 10 by radio waves. A question unit 24 is essential to the present invention and writes into and receives data from an answer unit 30, sends operational instructions as entered by the keyboard 26, and receives data as transmitted from the answer unit 30 in the form of radio waves.

The inventory storage/removal data and data relating to the identity/description of the articles are transferred through transmission/reception circuit 22 to the host computer system 10. It is to be understood that the transfer of data between the terminal device 20 and the host computer system 10 by means of the radio wave as well as the necessary circuit arrangement for carrying out the data transfer are known to those of skill in the art and therefore need no further description.

In response to the operation of the keyboard 26 or an instruction from the host computer system 10, the question unit 24 calls the answer unit 30 and receives and updates the data as stored in the answer unit 30.

The terminal device 20 is installed in an article conveying unit such as a forklift, as shown in FIG. 2. In the article conveying unit as shown in FIG. 2, the transmission/reception circuit 22 is mounted on the roof of the forklift, and the keyboard 26 and the display 28 are installed near the instrument/operation panel in front of the operator's seat. The question unit 24 is mounted at a location communicable with the answer unit 34.

Referring back to FIG. 1, each answer unit 30 is a memory unit capable of transferring data to and from the question unit 24 by radio waves. As shown in FIG. 3, an answer unit 32 is mounted on an article carrying unit (here, a pallet), and an answer unit 34 is mounted to a storage shelf of a storage stack 40. The answer unit 32 prestores data relating to the articles stored thereon, e.g., identification and description of the articles, quantity of the articles, manufacturing date(s), date of storage, etc., and identification data that identifies each particular answer unit 32. The answer unit 34 prestores data relating to the shelf address within the stack 40, the address of the stack 40, and identification data that identifies each particular answer unit 34.

Referring to FIG. 4, a central processing unit (CPU) 24A controls the entire system and executes the instruction sequences and control procedures stored in the read only memory (ROM) 24B. Random access memory (RAM) 24C is used for storing input/output data to and from the CPU 24A as well as article storage/removal data and inventory data.

A first transmitter 24D transmits various kinds of data to the answer unit 30 in accordance with the instructions sent by the CPU 24A Any suitable radio transmitter may be used as the first transmitter 24D. In order to receive only the transmission data from a specific answer unit, an effective communication range of radio wavelength of the first transmitter may be set to be within an interval between the answer units 30 or the receiving direction may be restricted to a specific one. In order to communicate with a plurality of answer units, an effective communication range of wavelengths for each transmitter may be appropriately selected in non-overlapping manner.

The first transmitter 24D transmits data including the identification data of the specific answer unit 30, the instruction to read out the data from the specific answer unit, and instructions to write the transmitted data into the specific answer unit.

A first receiver 24E receives input data from the answer unit 30 and outputs data to the CPU 24A. The circuitry of the receiving units are operatively associated with a transmission/reception circuit 22, keyboard 26, and a display unit 28. The display unit 28 displays input data from the answer unit 30, data from the host computer 10, and data entered through the keyboard 26.

Referring to FIG. 5, which illustrates the circuit arrangement of an answer unit 30 shown in FIG. 1, a central processing unit (CPU), 30A executes instruction sets and control procedures, which are stored in ROM 30B, and transfers data to and from question unit 24. The CPU 30A also writes to and reads data from RAM 30C, and the data stored in the RAM 30C is assured by backup battery power. The random access memory units may be substituted by other memory devices provided that such other memory devices are non-volatile and are capable of relatively high-speed, multiple read and write operations.

The read only memory unit (ROM) 30B comprises two memory regions wherein a first region is used for storing identification data relating to the specific answer unit, i.e., answer unit 32 or 34, etc. In regard to answer unit 32, which is provided on an article carrying unit, the general data stored in the ROM 30B comprises information relating to the identity of the stored articles, the quantity of stored articles, and other article storage/removal data. In regard to answer unit 34, which is provided on a shelf in a stack 40, the general data stored in the ROM 30B comprises information relating to the storage shelf address.

A transmitter circuit 30D is used for transmitting the general data and the ID data as read out from RAM 30C, by radio waves. A receiving circuit 30E receiving and transmitting in two different frequency band of the receiving circuit 30E is used for transmitting and receiving general data to and from the question unit 24, and the second frequency band is used for transmitting and receiving update identification data when the identification data is renewed. By using the dual frequency band arrangement, errors during identification data renewal operations, which may be caused by operator error or radio interference, may be avoided.

Referring to the control flowcharts shown in FIGS. 6 (question unit 24), 7A (answer unit 32) and 7B (answer unit 34), these control flowcharts illustrate the sequence of instructions and control exercised when articles carried by an article carrying unit 50 (e.g., a pallet) having an answer unit 32 is conveyed into a warehouse by a conveying unit (e.g., a forklift). Both the general data relating to the articles and the identification data are, as previously noted, prestored on the answer unit 32.

Figure 7B:
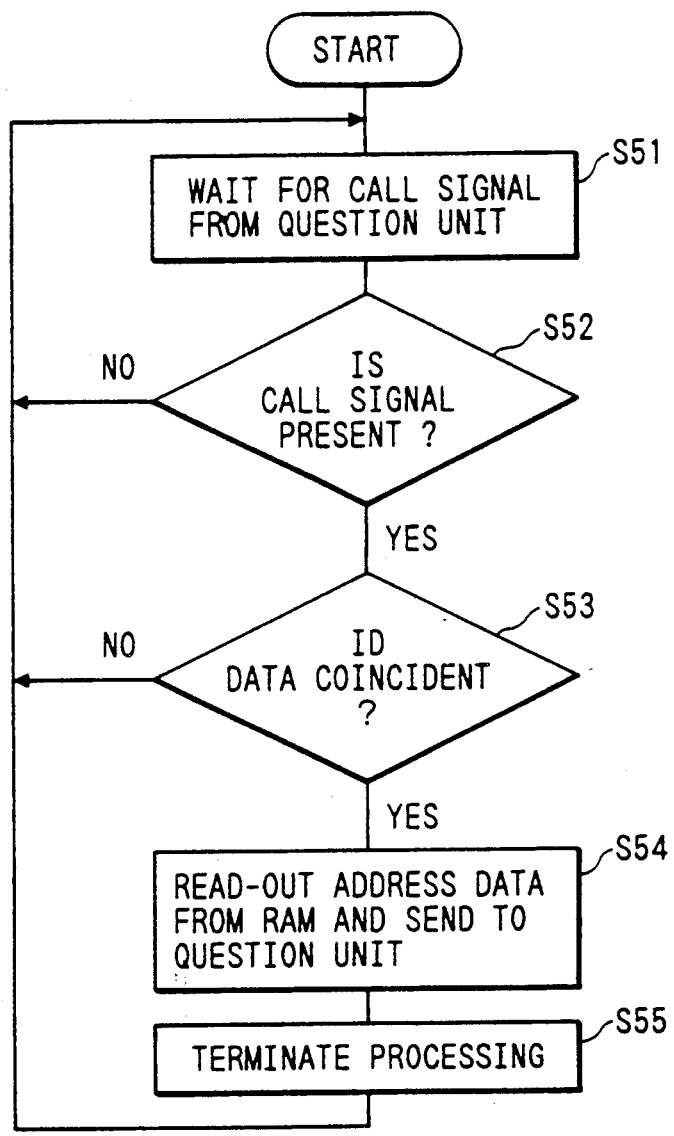
FIG. 7B is a flowchart diagram showing the control and logic circuitry of another answer unit.

When no work instruction is sent by the question unit 24 to the answer units 32 and 34, the answer units 32 and 34 stand by and wait for a call-to signal from the question unit 24 in Steps S31 and S51 as illustrated in FIGS. 7A and 7B. Upon receipt of the work instruction, an operator conveys the article carrying unit 50 (e.g., pallet) into a warehouse using the article conveying unit (e.g., forklift), and operates a specific key on the keyboard 26 of the terminal device 20 (see FIG. 1). At this time, the question unit 24 determines in step S1 that a storage work instruction is present. In step S2, the question unit sends a call-in instruction to the answer unit 32 on the article carrying unit 50 (e.g., a pallet), which is carried on the conveying unit (e.g., forklift), and a call-to signal is sent from the first transmitter 24D. Upon receipt of the call-to signal by the receiver 30E of the answer unit 32 shown in FIG. 5, the control sequence (FIG. 7A) of the answer unit 32 jumps out of the closed loops of steps S31 and S32 and advances to step S33. In step S33, the answer unit 32 compares the identification data contained in the call-to signal with the identification data stored in the RAM 30C (see FIG. 5) of the answer unit 32 and confirms that the call-to signal is direction toward the correct answer unit. If it is confirmed that the correct answer unit has received the call-to signal, the answer unit 32 advances to step S34. In step S36, the answer unit 32 reads out the general data including the article identification data and the quantity of stored articles, storage date, manufacturing date, etc., and the identification data, and sends these data from the transmitter 30D (see FIG. 5). The data transmitted by the answer unit 32 via the transmitter 30D is received by the first receiver 24E in the question unit 24. The question unit 24 then jumps out of the closed loop of step S3 and in step S4 reads the data transmitted by the answer unit 32 via the first receiver 24E and then in step S5 transfers the data through the transmission/reception circuit 22 (see FIG. 4) to the host computer system 10. The host computer reads the data and decides where to store the articles, i.e., the storage shelf address within the stack 40, and sends the storage shelf address data to the terminal device 20. The storage shelf address data generated by the host computer 10 is transmitted through a route beginning with the CPU 14 through a transmission/reception circuit 12 (of the host computer 10) through a transmission/reception circuit 22 (of the terminal device 20) to the question unit 24 (of the terminal device 20). When the question unit 24 receives the storage shelf address data, the question unit 24 goes from step S6 to S7 while temporarily storing the storage shelf address data into the RAM 24C in the question unit 24. In step S8, the question unit 24 displays the data screen using the display unit 28, as shown in FIG. 8A.

Figure 8A:
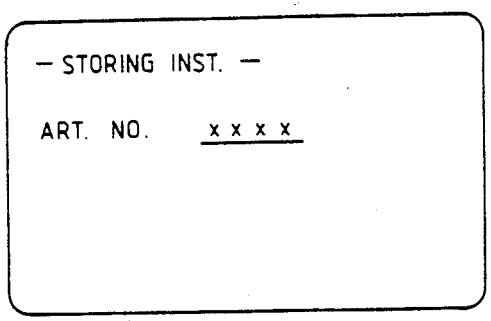
FIG. 8A is an example of a display of address data by the display unit.

An operator reads the display of FIG. 8A in the display unit 28 of the terminal device 20 and operates the article conveying unit (e.g., a forklift) in order to move the article carrying unit 50 (e.g., a pallet) having thereon the articles to be stored to the specified storage shelf address in the stack 40. Upon arrival at the specified storage shelf address, the operator sends a call-to instruction to the answer unit 34 installed on the stack 40 by use of the keyboard 26 (step S9). The answer unit 34 then jumps out of a closed loop of step S51 and S52 and proceeds to step S53 where the identification data is checked. In step S53, the answer unit 34 reads out the storage shelf address data from the RAM 30C and sends it out to the question unit 24 of the terminal device 20. Upon receiving the storage shelf address data, the question unit 24 jumps out of step S10 and proceeds to step S11 where the received storage shelf address data is compared with the data which was stored (temporarily) in the RAM 24C of the question unit 24. The result of the comparison of the two sets of data in step S11 (the coincidence and noncoincidence of the data) are displayed by the display unit 28 (see FIG. 5) in steps S12 and S13, respectively, and provide a visual presentation to the operator. If the two sets of data do not coincide, the flow of control reverts back to step S9. If the two sets of data coincide/match, the flow of control ends.

When the storage shelf address data from the answer unit 34 does not coincide with the instruction data sent by the host computer 1, the operator, on the basis of independent judgement, operates the keyboard 26, sends the storage shelf address data of the answer unit 34 to the host computer 10, and modifies the address data from the host computer 10. Thereafter, the article(s) on the article carrying unit 50 (e.g., a pallet) is conveyed onto the particular storage shelf in the stack 40. Each storage shelf address data of the stack 40 and the storage/removal data relating to the article(s) stored in each storage shelf address are stored by the host computer 10 into a separate memory unit (not shown). Referring to FIG. 7A, in steps S35 and S37, general data is stored into the memory unit of the answer unit 32 in a separate data storage operation before the article(s) on the article carrying unit 50 (e.g., a pallet) is conveyed into the warehouse.

Figure 8B:
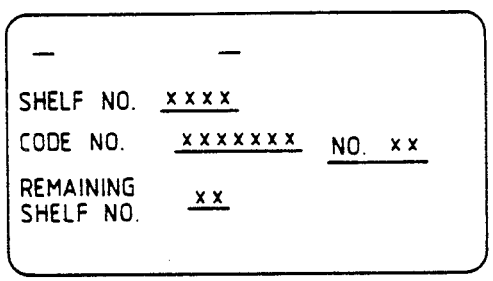
FIG. 8B is an example of a display of address data by the display unit.
Figure 8C:
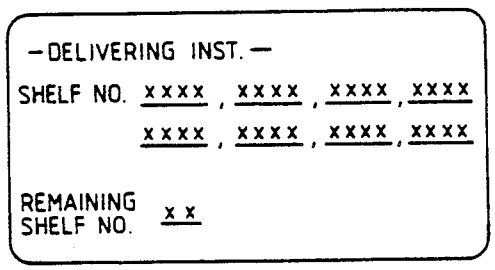
FIG. 8C is an example of a display of address data by the display unit.

In order to remove an article from the stack 40, an operator uses the keyboard 26 of the terminal device 20 on the article conveying unit (e.g., forklift) to call the host computer system 10 and requests the host computer to send back the requisite data for removal of the article. In response to the call-to signal from the terminal device identifying data including article removal code, address data, the quantity of articles, article removal data, etc. The data sent by the host computer is displayed by the display unit 28, as shown in FIG. 8B. If additional information such as the type or identity of the articles, the number of shelves of which the article conveying unit (e.g., forklift) will go around (see FIG. 8C), removal work efficiency may be improved.

On the basis of the information displayed on the display unit 28, an operator drives the article conveying unit (e.g., a forklift) toward the specified storage shelf address of the specified stack. The operator then instructs the question unit 24 of the terminal device 20 to send a call-to signal to the answer unit 34 on the stack 40. The question unit 24 reads the address data from the answer unit 34 and compares the two sets of storage shelf address data. If the comparison produces no discrepancy between the two sets of data, the operator confirms this using the display unit 28 of the terminal device 20, and picks up the article together with the article carrying unit 50 (e.g., a pallet) for removal. If the comparison results in a discrepancy between the two sets of data, it is most likely due to operator error, and the operator manipulates the article conveying unit 50 and repeats the aforementioned sequence of operations.

After the removal of the articles from the warehouse, the terminal device 20 transmits data relating to the removal of the articles indicating the results of article removal to the host computer 10. The house computer 10, upon receipt of this data, confirms the removal of the articles from the warehouse.

In order to conduct an inventory of the articles stored in the warehouse, an operator drives the article conveying unit (e.g., a forklift) and sets the question unit 24 against one of the storage shelves of the stack 40, operates a related key on the keyboard 26 in the terminal device 20, causes the question unit 24 to send a call-to signal to the answer unit 34, and reds in the address data from the answer unit 34 for the question unit 24. This address data read in for the question unit 24 is sent from the terminal device 20 to the host computer unit 10. On the basis of the address data, the host computer 10 retrieves the general data stored in the memory location of the corresponding address, and transmits the general data to the terminal device 20. The terminal device 20 accepts the general data and displays the general data on the display unit 28. The operator sees the instructions displayed by the display unit 28 and checks the articles on the article carrying unit 50 (e.g., a pallet) located on the storage shelves of the stack 40 while comparing the data displayed on the display unit 28 with the actual articles on the article carrying units 50. The results of the inventory are sent from the terminal device 20 to the host computer 10, and a print out of the results is obtained via the host computer 10. An inventory of articles stored in the storage shelves of the stack 40 is thereby performed.

As may be seen from the foregoing description, all article storage/removal data and inventory data are cumulatively stored only by the host computer system 1 in a separate electronic memory unit. Accordingly, the problems and disadvantages of the conventional ledger, viz., the problems associated with stains and wear and tear are avoided. Accordingly, the integrity of safe storage of inventory data is secured.

In order to access the article storage/removal data and inventory data, the question unit 24 must be used. Accordingly, this feature helps ensure that such data remains confidential and prevents dishonest access to the stored data in the answer units 32 and 34.

An advantageous feature from the perspective of both efficiency and convenience is that the terminal device 20 is mounted on the article conveying unit (e.g., a forklift) and relays information between the host computer 10 and the answer unit 30. Accordingly, the problems of inefficiency and inconvenience stemming from an operator having to physically walk between the host computer 10 and the stack 40 are largely eliminated.

It will be apparent to those skilled in the art that various modifications and variations can be made in the first aspect of the physical distribution system of the present invention without departing from the scope or spirit of the invention. For example, in the above-described embodiment, although the terminal device 10 is installed on the article conveying unit, the terminal device 10 may be designed to be portable allowing an operator to carry the terminal device. Additionally, although the terminal device 20 and the answer unit 30 described in the above embodiment communicate via radio waves, i.e., wireless operation, if necessary, the terminal device 20 and the answer unit 30 may be connected by a combination of wire and connectors. Furthermore, in the above-described embodiment, the CPU 30A in the answer unit 32 is used as a memory controller for the RAM 24C. The arithmetic function capabilities of the CPU may be used in such a way that to calculate the number of articles stored in a stack 40 on the basis of the number of articles which are stored or removed from the stack with the inventory data and the results of the calculations all stored in the memory as well.

In respect to the article carrying unit, although a pallet was used in the above-described embodiment, a capsule, box, or any other type of container may be used including specially shaped containers.

The answer unit 34 on the stack 40 may be replaced by the answer unit 32 on the article carrying unit 50, in which case, after an article is placed on a storage shelf, the address of the shelf is written into the answer unit 32 of the article carrying unit 50. In contrast, it may be desirable to have the answer unit 34 installed only on the stack. In this manner, the installation of the answer unit 34 may be properly selected according to the identity and quantity of the articles in conjunction with a particle method of storing the article.

In respect to the terminal device 20, although only one such device was used in the above-described embodiment, it is apparent that a plurality of article conveying units may each be provided with a terminal device.

Although the above-described embodiment of the present invention employs a parallel data processing system using a separate host computer and a separate terminal device, in the case of a small warehouse, it may be desirable to combine the host computer and the terminal device into a single integrated unit and installed on the article conveying unit.

If the case is such that the operation of conveying articles by the article conveying unit(s) is automated, the manual operation of the terminal device by an operator would be replaced by a program and be automatically controlled by the host computer.

Although a memory unit is fixedly provided to a pallet and/or an article storage shelf in the first aspect of the present invention, the memory unit may be removably provided on the article storage shelf. The second aspect of the present invention where the memory unit is removably provided on the storage shelf, will be described with reference to FIGS. 2B, 3B, 9 to 12. The basic system of the second aspect of the present invention is same as that shown in FIG. 1.

Figure 2B:
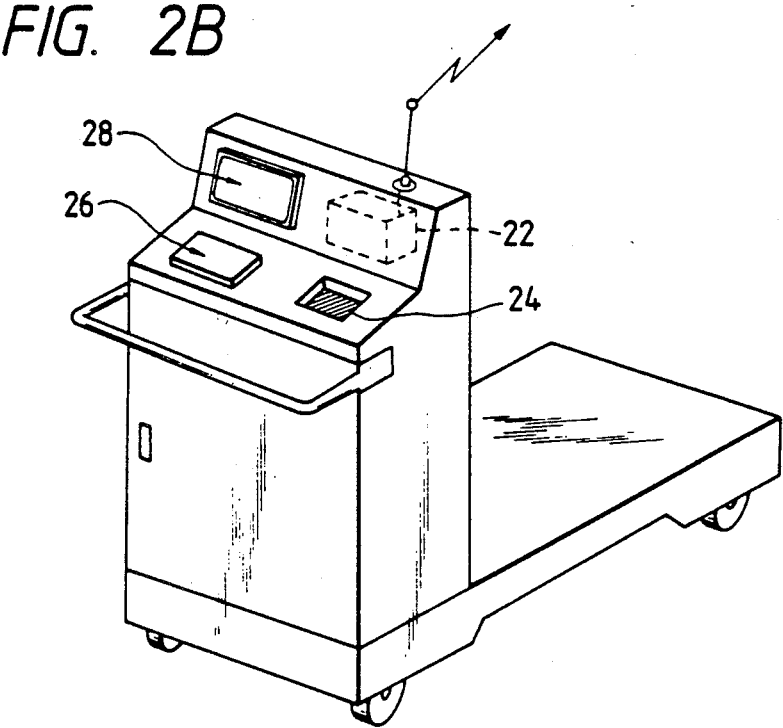
FIG. 2B is a perspective vies of a second example of a conveying unit having a terminal device installed thereof which is used in the second aspect of the present physical distribution system.

FIG. 2B is a perspective view of a second example of a conveying unit having a terminal device installed thereon which is used in the second aspect of the present physical distribution system and FIG. 3B is a perspective view of an article storage stack illustrating the layout of answer units 34 in a storage stack 40. As shown in FIG. 2B, a question unit 24 is provided in such a manner that the answer unit 34 can be placed readily when the answer unit 34 is brought to an article conveying unit. Further, as shown in FIG. 3B, the answer units 34 are placed in the storage stack 40 so that the number of answer units 34 and the position thereof are determined to meet the configuration of articles. Each of the answer units 34 stores article information with respect to an address of storage place assigned to the designated article, a kind of the article, the number of articles and the like.

Figure 9:
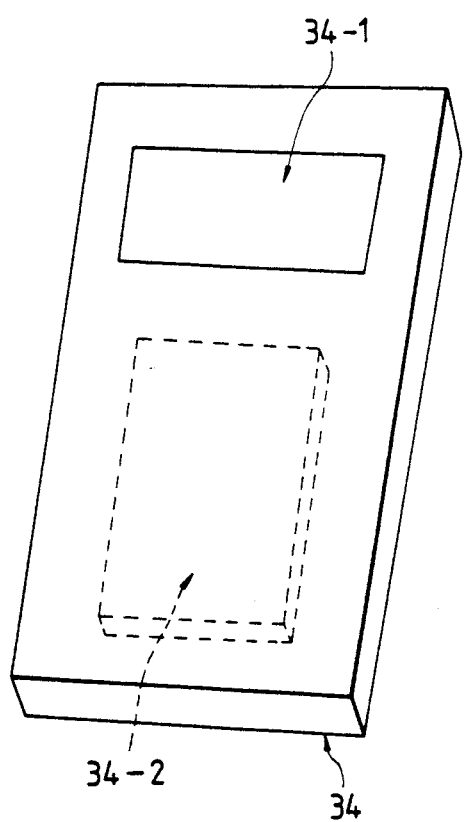
FIG. 9 is a schematic diagram illustrating an answer unit which is to be used in the second aspect of the present physical distribution system.

FIG. 9 is a perspective view illustrating an example of the answer unit 34. As shown in FIG. 9, the answer unit 34 is a portable type, which comprises a main frame shaped like a plate, a display section 34-1 for displaying the article name or code, and a processing circuit as shown in FIG. 5.

Figure 11:
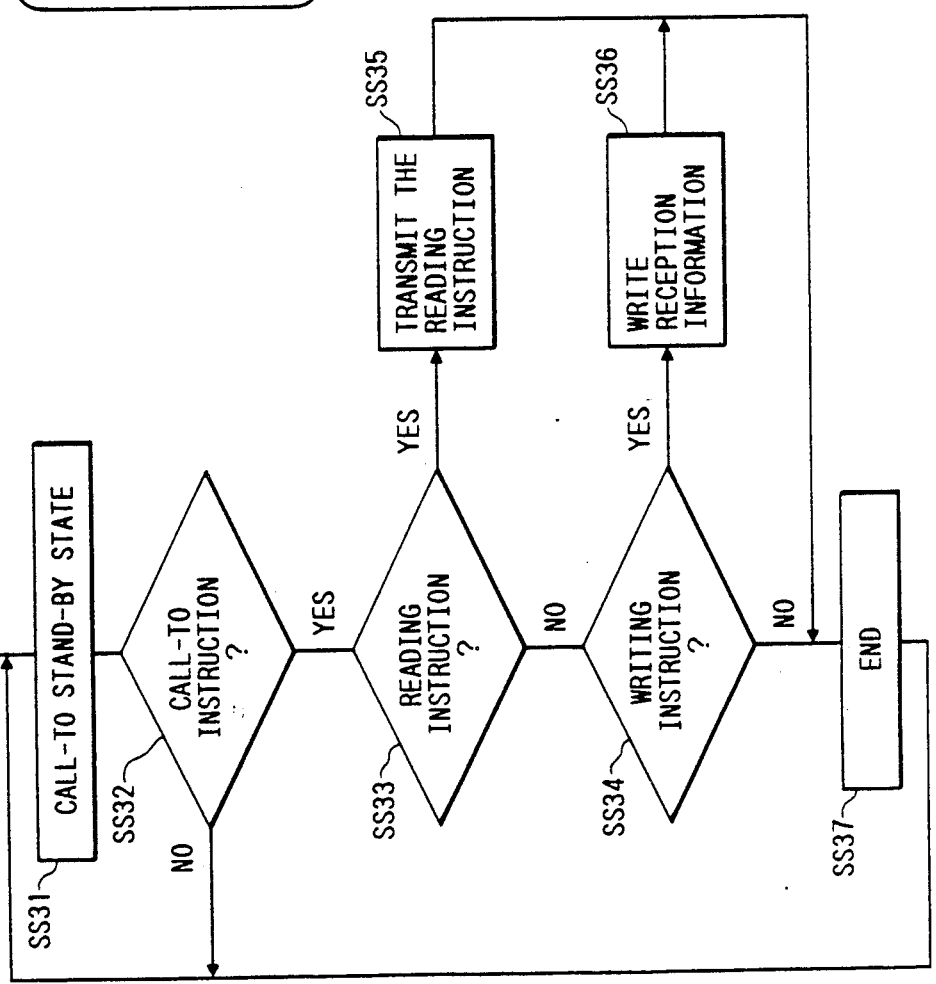
FIG. 11 is a flowchart diagram showing the control logic of an answer unit, and is to be used in the second aspect of the present physical distribution system.

FIG. 10 is a flowchart showing the sequence of instructions and control carried out by the question unit 24. FIG. 11 is a flowchart showing the same carried out by the answer unit 34.

The operation of the second aspect of a physical distribution system thus arranged will be described with reference to FIGS. 10 and 11.

When the answer unit 34 placed in the storage shelf of the storage stack in a warehouse receives no work instruction from the question unit 24, it stands by and waits for a call-to signal from the question unit 24.

Upon receipt of the work instruction, an operator conveys a pallet into the warehouse and operates a specific key on the keyboard 26 of the terminal device 20 (see FIG. 1). At this time, the question unit 24 in step SS1 that a storage work instruction is present. In step SS2, the question unit sends a request signal to the host computer system 10, and requests the host computer system 10 to send storage instruction data back. Upon receipt of the request signal, the host computer system 10 determines a storage location in the storage stack 40 on which an article is to be stored. Then, the computer system 1 sends article data relating to the article storage location, article code, and the quantity of articles, and the like, to the terminal device 20. The article data produced by the host computer system 1 is transferred through a route defined by computer 14→transmission/reception 12 (both contained in the host computer system 10→transmission/reception device 22 →question unit 24 (both in the terminal device 20). Upon receipt of the article data, the control sequence of the question unit 24 advances to step SS4. In this step SS4, the question unit 24 temporarily stores in a RAM 10-2C thereof, and advances to step SS5 where article information as shown in FIG. 2 is displayed in a display unit 28.

Figure 12:
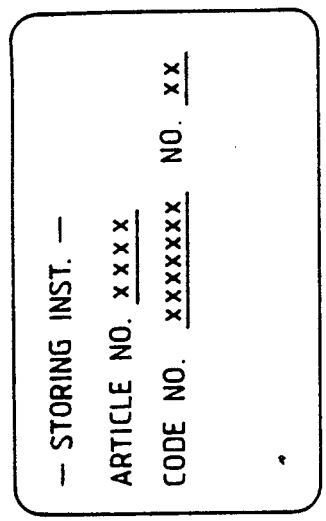
FIG. 12 is an example of a message upon conveying an article to a storage shelf unit.

The operator reads the display of FIG. 12 in the display unit 28, and operates the pallet in order to convey the articles thereon to the storage shelf of the stack 40. Upon arrival at the specified storage shelf address, the operator picks up the answer unit 34 placed on the specified storage location, and places the answer unit 34 on the question unit 24. At this time, the answer unit 34 is placed in a communication area of the question unit 24. Then, the operator operates a related key on the keyboard 26 of the terminal device 20, and sends a call-to instruction to the answer unit 34 placed on the storage shelf of the stack 40 (step SS6). In response to the call-to signal, the answer unit 34 jumps out of a closed loop of step SS31 and step SS32, and advances to step SS33 (see FIG. 11). In step SS35, the answer unit 34 reads out the article data from the RAM 20-2 in accordance with a read instruction contained in the call-to signal. The answer unit 34 sends the article data as read out to the question unit 24 in the terminal device 20. Upon receiving the article data, the question unit 24 goes out of step SS7 and advances to step SS8 where the article data is compared with the article data of storage location, article code, etc., which is stored in the RAM 10-2 of the question unit 24. The results of the comparison of the two sets of data in step SS8, viz., coincident and noncoincident of the data, are displayed by the display unit 28 (FIG. 9) in steps SS9 and SS10, respectively, and provide a visual presentation to the operator. If the two sets of data do not coincide, the flow of control reverts back to step SS6. If the two sets of data coincide with each other, the flow control ends.

When the storage location data from the answer unit 34 does not coincide with the storage location as instructed by the host computer system 10, an operator, on the basis of independent judgement, operates the keyboard 26 to send the storage location data of the answer unit 34 to the host computer system 10, and replaces the old storage location data stored in the host computer system with the new one.

Thereafter, the article (it is single in number in this instance) carried on the pallet is conveyed onto the particular storage shelf of the stack 40. Then, the keyboard 26 of the terminal device 20 is operated to update the article data in the answer unit 34, viz., the remnants of the articles for each article code, in accordance with the storage of the article. At the same time, each storage location to the article as stored at the storage location as well are written into the related memory in the host computer system.

Then, the operator picks up the answer unit 34 as has been placed on the question unit 24 of the pallet, and replaces it on the storage shelf. At this point, the storing work of the article is completed.

In the flowchart of FIG. 11, steps SS34 and SS36 for storing article data to the answer unit 34 are executed to write the updated data of the article data of the article to be stored into the storage shelf of the stack 40.

In order to remove an article from the stack 40, an operator uses the keyboard 26 of the terminal device 20 on the pallet to call the host computer system 10 to request the host computer system 10 to send back the requisite data of removal of the article. In response to the request signal from the terminal device 20, the host computer system 10 sends to the terminal device 20 identifying data including article removal code, the quantity of articles, etc, and data indicative of storage location from which the article is removed. The data sent by the host computer system is displayed by the display unit 28, as shown in FIG. 8B. If additional information such as the type or identity of the articles, the number of shelves of which the pallet will go round (see FIG. 8C), the removal work efficiency may be improved.

After seeing the information displayed on the display unit 28, an operator moves the pallet toward the storage shelf of the stack 40 as is specified. When reaching the specified storage shelf, he picks up the answer unit 34 on the shelf and puts it on the question unit 24 on the pallet. Electrically, the answer unit exists in a communication area of the answer unit. Under this condition, the question unit 24 of the terminal device 20 sends a call-to signal to the answer unit 34 that is now placed on the question unit. Then, the question unit 24 reads article data from the answer unit 34, and checks if it matches the article data of removal of the article. If the results of the check show no discrepancy between the two sets of data, the operator confirms this using the display unit 28, and transfers the specified article from the shelf to the pallet. If the check results in a discrepancy between the two sets of data, it is most likely due to operator error, and the operator moves the pallet and repeats the aforementioned sequence of operations.

In case that the article code and the storage location data are related to each other in one-to-one correspondence, it is only needed that either of the article code and the storage location data is subjected to the match-/mismatch check processing. In case that the two sets of data are related not in the above manner, for example, articles of the same article code are stored in different storage locations or articles of different article codes are stored in the same storage shelf, the article code and the storage location data must be both subjected to the match/mismatch check processing. If a discrepancy exists between the two sets of the data indicative of the quantity of articles from the host computer system 10 and from the answer unit 34, the operator must check whether incorrectness exists in the instruction data from the host computer system 1 or the article data from the answer unit 34, and corrects the incorrect data by using the keyboard 26.

After the removal of the article from the specified storage shelf, the operator operates the keyboard 26 to update the data of the quantity of the rest articles in the answer unit 34 for each article code in accordance with the details of the article removal. At the same time, the removal data indicative of the removal results is sent from the terminal device 20 to the host computer system 10. Receiving this, the host computer system 10 confirms the inventory data. Subsequently, the operator picks up the answer unit 34 that is placed on the question unit 24, and replaces it onto the storage shelf of the stack 40. Here, the removal work of article ends.

To conduct an inventory of the article stored in the warehouse, an operator moves the pallet toward an intended storage shelf of the stack, takes up the answer unit 34 from the storage shelf, and places it on the question unit 24. The operator operates the related key of the keyboard 26, to cause the question unit 24 to send a call-to signal to the answer unit 34. In response to the call-to signal, the answer unit 34 returns the article data relating to storage location, article code, quantity of articles, etc., to the question unit 24. The article data is stored into the question unit 24. The stored article data is sent from the terminal device 20 to the host computer system 10. Receiving the article data, the host computer system 10 retrieves the article data representative of the corresponding storage location or article code on the basis of the storage location or the article code as received, and sends the retrieved data to the terminal device 20. The terminal device 20, when receiving the article data, displays the article data from the host computer 10 and the answer unit 34 by the display unit 28. While seeing the data displayed on the display unit, the operator checks the actual articles stored on the shelf in comparison with the article data from the host computer system 10 as a ledger. The answer unit 34 also stores the article data that is checked every time the storage and removal of articles are carried out, and is the same as that of the host computer system 10. Accordingly, the article data of the answer unit 34 may be used for the inventory-taking. It is suggestible, however, that the article data of the host computer system 10 is used for the inventory of articles when the data stored in the host computer system 10 is used as a ledger. There is another possible way of the inventory that the article data in the host computer system 10 is compared with that in the answer unit 34. Also in this case, an acceptable way for the inventory, from the practical viewpoint, is to compare the actual articles with the article data of the host computer system 10.

The results of the inventory are sent from the terminal device 20 to the host computer system 10, and a print-out of the results is obtained via the host computer system 10.

As may be seen from the foregoing description, all article/storage data and inventory data are cumulatively stored only by the host computer system 10 in a separate electronic memory unit. Accordingly, the problems and disadvantages of the conventional ledger, viz., the problems associated with stains and wear and tear are avoided. Accordingly, the integrity of safe storage of inventory data is secured. It is noted that the current article data are stored also in the answer unit 34. This implies that if the corresponding data stored in the host computer system is accidentally destroyed, the data stored in the answer unit are available in place of the destroyed data.

In order to access the article storage/removal data and inventory data, the question unit 24 must be used. Accordingly, this feature helps ensure that such data remains confidential and prevents dishonest access to the stored data in the answer unit 34.

An advantageous feature from the perspective of both efficiency and convenience is that the terminal device 20 is mounted on the pallet and relays information between the host computer system 10 and the answer unit 40. Accordingly, the problems of inefficiency and inconvenience stemming from an operator having to physically walk between the host computer system 10 and the stack 40 are largely eliminated.

It will be apparent that various modifications and variations of the second aspect of the physical distribution system of the present invention are possible in the light of the above teaching. Some specific examples other than the above described examples with regard to the first aspect will be referred to below.

In the above-described embodiment, the answer unit 34 is placed on the storage shelf of the stack, but is not placed for a container containing articles. If required, it may be removably placed on the container per se in such a manner that the answer unit is placed on the question unit in the above-mentioned embodiment. In this case, the article data is written into the answer unit placed on the container when the articles are put in the container and the container containing the articles is stored on a storage shelf of the stack. A capsule, box, or any other type of container may be used for the article carrying unit. If necessary, the answer unit may be installed on the article per se. In this way, the answer unit may be properly installed depending on the kinds of the articles to be stored and storage methods. Further, while in the above-mentioned embodiment, the storage/removal data is entered from the keyboard 26 in the host computer system 10, it may be entered from the keyboard 26 in the terminal device 20. In a modification, the storage/removal data is prestored in the article container. When it is carried to the storage shelf, the prestored data is read out by an answer unit, which is different from that 24 of the terminal device 20, and is entered to the terminal device 20.

As seen from the foregoing description, in a physical distribution system of the present invention, to store articles, a data processing system sends article data indicative of the articles to be stored to a terminal device in accordance with storage data prestored in the data processing system. On the basis of the article data, an article carrying unit is moved to a storage location as specified by the data. When arriving at the location, an operator picks up an answer unit that is placed on the storage shelf of a storage stack and puts it on a question unit of the article carrying unit. The terminal device reads article data out of the memory device on the storage shelf, compares the read out data with the corresponding article data from the data processing system. The terminal device confirms coincidence of the actual articles placed on the storage location with the data stored in the data processing system. This feature provides an improved exactness of that coincidence. To remove the articles from the stack in the warehouse, the data processing system sends the removal data as article data to the terminal device. Also when an article is removed from the storage shelf, the operator picks up the answer unit from the storage shelf, and puts it on the question unit of the article carrying unit. In the terminal device, the article data relating to the article on the storage shelf is read out and is compared with the data from the data processing system. A compete coincidence of the article data of the data processing system with the actual article is secured, while being free from an error by an operator operating the article carrying unit The data coming between the article carrying unit and the memory unit is transferred to and from the data processing system by way of the article carrying unit. This feature implies that it is possible to obtain the article data in its totality by the data processing system.

There is a case that at the time of inventory-taking, at the location of the storage shelf where an operator can directly contact the article, the operator enters the data of the shelf location or article code to the data processing system. In such a case, the operator reads the storage location or the article code from the memory unit that is placed on the storage shelf by using the terminal device of the article carrying unit, and automatically sends it to the data processing system. This feature implies that any manual operation by an operator using the keyboard for entering the above is not required and hence no input error due to mistaken operations by the operator that would possibly occur will be produced.

What is claimed is:

1. An article storage/removal and distribution system, comprising:
    a shelf unit for storing at least one article;
    a conveying unit for conveying said article to and from said shelf unit;
    a terminal unit provided on said conveying unit for transmitting and receiving data signals, said data signals comprising, article data and address data, said address data corresponding to a location of said shelf unit;
    a data processing unit remotely provided from said shelf unit and said conveying unit for transmitting data signals to and receiving said signals from said terminal unit;
    a memory unit, mounted on said shelf unit and responsive to a call signal transmitted by said terminal unit, for transmitting to and receiving data signals from said terminal unit;
    said terminal unit comparing data signals from said memory unit to data signals from said data processing unit.

2. The article storage/removal and distribution system according to claim 1, further comprising:
    an article carrying unit for supporting said at least one article, wherein said conveying unit conveys said article carrying unit with said at least one article to and from said shelf unit;
    another memory unit mounted on said article carrying units, responsive to said call signal, for transmitting to and receiving data signals from said terminal unit;
    said terminal unit comparing data signals received from said memory unit to data signals received from said another memory unit.

3. The physical distribution system according to claim 1, wherein said terminal means comprises a question unit, a central processing unit, a read only memory unit, a random access memory unit, a radio wave transmitter and receiver, a radio wave transmission/reception circuit, a keyboard unit and a display unit.

4. A method of storing/removing and distributing articles of manufacture, comprising the steps:
    determining whether a work instruction is present at a terminal unit on a conveying unit;
    transmitting a call signal from said terminal unit to a memory unit associated with an article;
    transmitting article data from said memory unit to said terminal in response to said call signal;
    transmitting said article data from said terminal to a data processing unit remotely provided from said conveying unit;
    transmitting address data from said data processing unit to said terminal unit in response to said article data;
    moving said conveying unit to or from a shelf unit corresponding to said address data;
    transmitting said call signal from said terminal unit to another memory unit mounted on said shelf unit;
    transmitting address data from said another memory unit to said terminal;
    comparing address data from said another memory unit to address data from said data processing unit;
    storing said article on or removing said article from said shelf unit upon coincidence of address data from said another memory unit to address data from said data processing unit.

5. A method of storing/removing and distributing articles of manufacture according to claim 4, wherein said terminal unit comprises interface means including a display unit, for facilitating transfer of data to or from an operator of said conveying unit, further comprising the steps of:
    entering said work instruction by said operator through said interface means;
    displaying address data from said data processing on said display;
    displaying the results of said address data comparison on said display.

* * * * *